Patented Dec. 16, 1941

2,266,229

UNITED STATES PATENT OFFICE

2,266,229

SOLID DIAZOAZO SALT AND THE PROCESS OF PREPARING SAME

Ernest M. May, South Orange, N. J., assignor to May Chemical Corporation, Newark, N. J., a corporation of New Jersey No Drawing. Application September 6, 1940, Serial No. 355,617

2 Claims. (Cl. 260—141)

This invention relates to a solid stable diazoazo salt and to a process of preparing it; more particularly it relates to a process comprising adding to the aqueous solution of diazotized ortho aminoazo toluene a sufficient amount of soluble dihydrogen phosphate salt to form the dihydrogen diazonium phosphate and separating the solid diazoazo salt thus obtained.

Solid stable diazo salts are used by the dyer or printer by first dissolving them in water, thickening the solution with a gum where a printing operation is involved, and coupling on the fiber which has been impregnated with the coupling component. It is of great importance, especially when the diazo salt is to be used for the printing operation, and consequently concentrated solutions of the diazo salt are desired, that the diazo salt should have a good solubility, so that heavy as well as light shades may be obtained. This is especially true of diazotized ortho aminoazo toluene which is mainly used by the dyer or printer for obtaining heavy shades.

Of the products heretofore known to the art, the zinc chloride, cadmium chloride, and naphthalene disulfonic acid salts of diazotized ortho aminoazo toluene are too insoluble to produce heavy prints. The acid sulfate salt of diazotized ortho aminoazo toluene is superior in this respect, being more soluble. Now, one of the important advantages of the dihydrogen phosphate salt of diazotized ortho aminoazo toluene of the following formula

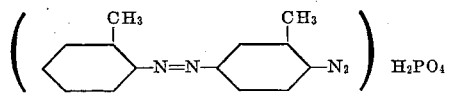

is that it has a solubility which exceeds that of any of the other salts mentioned above. As a consequence, the dyer or printer can obtain heavier shades with this particular diazoazo salt.

In the preparation of diazo salts it is of great technical importance that the wet product isolated from the reaction liquor contain as little moisture as possible since the drying operation of these sensitive materials is an extremely hazardous one. Most diazo salts separate from the reaction liquor on the addition of various reagents such as zinc chloride and salt, in a macrocrystalline state, and filter readily, and may be filtered to yield a comparatively dry cake. However, the diazo salts of ortho aminoazo toluene have a great tendency to separate from their reaction liquor as extremely fine crystals, which are difficult to filter and which yield a filter cake which contains relatively large amounts of water and which is mushy and hard to handle.

All the substances (such as zinc chloride, sulfuric acid, cadmium chloride, etc.,) which have been heretofore used to precipitate diazotized ortho aminoazo toluene, cause complete or partial precipitation of very fine crystals to occur immediately upon the addition of a sufficient quantity of the precipitating reagent. The conditions under such circumstances are not favorable for the formation of large crystals. Now, as mentioned above, the dihydrogen phosphate salt of diazotized ortho aminoazo toluene is more soluble than any other diazo salt of ortho aminoazo toluene heretofore known to the art (with the exception of the chloride, which, however, is too unstable to have any significance as a solid stable diazoazo salt), and, as a result of this property, it is possible to add all of the phosphate precipitant to a solution of diazotized ortho aminoazo toluene to form a supersaturated solution of this product. When this solution is slowly cooled without stirring, large crystals of the diacid diazonium phosphate are slowly formed. This product may be readily filtered, and the filter cake is hard and relatively dry. On standardizing and drying, a solid diazoazo salt of excellent stability and solubility is obtained.

The following example serves to illustrate the invention, but is not intended to limit it thereto. In place of monosodium diacid phosphate, a mixture of phosphoric acid and trisodium phosphate, or a solution of other soluble phosphates in conjunction with mineral acids, which will yield on admixture with the diazo solution a solution of a pH in the range in which the diazo compound is stable and the proper precipitation takes place, may be used.

Example

Sixty-five and five-tenths grams ortho aminoazo toluene hydrochloride are added with stirring to one thousand grams water to which sixty-seven cc. hydrochloric acid (22° Bé.) has been added. The mixture is cooled externally to 6° C. and a solution of nineteen grams sodium nitrite in forty grams water is added in five minutes at 6 to 8° C. The mixture is stirred fifteen minutes and then filtered after the addition of a little filtercel.

A solution of one hundred and eighty grams anhydrous mono sodium dihydrogen phosphate in seven hundred cc. water is then added rapidly, and the solution stirred for a few seconds. The temperature at this point should be 15 to 18° C. The solution at this point is clear. After a few minutes a slow deposition of crystals may be noted. The solution is now placed in the refrigerator and allowed to cool to about 4° C. overnight during which time the diacid phosphate salt slowly crystallizes in large crystals. On filtration and pressing, the filter cake weighs approximately eighty-three grams. It is then mixed with a standardizing agent such as sodium or magnesium sulfate and dried at low temperature.

I claim:

1. The solid diacid diazonium phosphate of ortho aminoazo toluene, corresponding to the following formula:

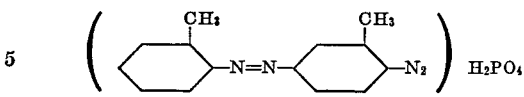

2. The process of preparing a solid diazoazo salt, said process consisting in the addition of a soluble dihydrogen phosphate salt in solid or dissolved form to a solution of diazotized ortho aminoazo toluene, and the filtration and drying of the diazoazo salt thereby obtained.

ERNEST M. MAY.